US008327776B2

(12) United States Patent
Endo

(10) Patent No.: US 8,327,776 B2
(45) Date of Patent: Dec. 11, 2012

(54) PALLET

(75) Inventor: Haruhiro Endo, Yamato (JP)

(73) Assignee: Kyoraku Co., Ltd., Kyoto-shi, Kyoto (JP)

( * ) Notice: Subject to any disclaimer, the term of this patent is extended or adjusted under 35 U.S.C. 154(b) by 216 days.

(21) Appl. No.: 12/451,135

(22) PCT Filed: Apr. 28, 2008

(86) PCT No.: PCT/JP2008/058217
§ 371 (c)(1),
(2), (4) Date: Oct. 26, 2009

(87) PCT Pub. No.: WO2008/139926
PCT Pub. Date: Nov. 20, 2008

(65) Prior Publication Data
US 2010/0058959 A1   Mar. 11, 2010

(30) Foreign Application Priority Data

Apr. 27, 2007  (JP) ................ 2007-120243

(51) Int. Cl.
*B65D 19/38*  (2006.01)
(52) U.S. Cl. ..................... 108/57.27; 108/55.1
(58) Field of Classification Search ............... 108/51.11, 108/53.1, 53.3, 57.25, 57.27, 55.1
See application file for complete search history.

(56) References Cited

U.S. PATENT DOCUMENTS

| 4,413,737 | A | * | 11/1983 | Wind | 206/599 |
|---|---|---|---|---|---|
| 4,742,781 | A | * | 5/1988 | Shuert | 108/53.3 |
| 4,765,252 | A | * | 8/1988 | Shuert | 108/55.1 |
| 5,638,760 | A | * | 6/1997 | Jordan et al. | 108/57.25 |
| 5,829,595 | A | * | 11/1998 | Brown et al. | 206/600 |
| 6,250,234 | B1 | * | 6/2001 | Apps | 108/57.25 |
| 6,651,815 | B1 | * | 11/2003 | Koefelda | 206/527 |
| 6,718,888 | B2 | * | 4/2004 | Muirhead | 108/57.25 |
| 6,837,377 | B2 | * | 1/2005 | Shuert | 206/599 |
| 6,874,428 | B2 | * | 4/2005 | Apps | 108/57.25 |
| 6,935,249 | B2 | * | 8/2005 | Moore, Jr. et al. | 108/57.25 |
| 2002/0011195 | A1 | * | 1/2002 | Apps | 108/57.25 |
| 2004/0060839 | A1 | * | 4/2004 | Hergeth | 206/386 |
| 2006/0032413 | A1 | * | 2/2006 | Ogburn et al. | 108/57.25 |
| 2006/0242901 | A1 | * | 11/2006 | Casimaty et al. | 47/65.9 |
| 2009/0183655 | A1 | * | 7/2009 | Ogburn | 108/57.25 |

FOREIGN PATENT DOCUMENTS

| JP | 49 88957 | 8/1974 |
|---|---|---|
| JP | 60-90133 | 5/1985 |
| JP | 6134842 | * 10/1993 |
| WO | WO 93/18906 | 9/1993 |

* cited by examiner

OTHER PUBLICATIONS

European Patent Office Search Report dated Mar. 29, 2011 (6 pages).

*Primary Examiner* — Jose V Chen
*Assistant Examiner* — Matthew Ing
(74) *Attorney, Agent, or Firm* — Flynn, Thiel, Boutell & Tanis, P.C.

(57) ABSTRACT

A pallet 10 having a hollow double-walled structure formed by blow molding includes a first wall 13 on which a cargo is placed, a second wall 14 spaced apart from the first wall 13 by a predetermined distance, and inner ribs that connect the first wall 13 and the second wall 14. In the pallet 10, the inner ribs are respectively formed by continuously abutting and integrating end surfaces of first inner ribs 13*a* and 13*b* projecting from the first wall 13 toward a hollow portion and end surfaces of second inner ribs 14*a* and 14*b* projecting from the second wall 14 toward the hollow portion.

3 Claims, 9 Drawing Sheets

PALLET

TECHNICAL FIELD

The present invention relates to a pallet for conveyance and a pallet for a transport container having inner ribs formed in a hollow portion of its inner part.

BACKGROUND ART

Conventionally, in order to efficiently convey cargos, pallets for conveyance or transport containers have been used. As such pallets, a pallet being lightweight and having a high bending strength has been developed by partially forming cross-shaped inner ribs, centered around a post composed of a recess, inside a cargo mounting stand with a hollow double-walled structure (see Patent Document 1).

A pallet with a hollow double-walled structure exhibits great bending strength for bending stresses in all directions applied when supported by a fork lift or the like by forming cross-shaped inner ribs within a hollow portion of the pallet. This pallet with a hollow double-walled structure is mainly manufactured by blow molding.

A method for manufacturing the pallet with a hollow double-walled structure by blow molding is a method for thrusting on a parison arranged between split molds a plate-shaped member (hereinafter denoted by a "blade") arranged in a grid shape from one of the molds toward the other mold before the parison is set, to form an extension portion having a given width. After the extension portion is formed, the blade is pulled out of the parison, and a pressurized fluid is blown into the parison. This causes a space formed by the extension portion to be forcedly closed by the pressure of the pressurized fluid, to complete a pallet with a hollow double-walled structure having grid-shaped inner ribs in its inner part.

When an attempt is made to manufacture a pallet having higher bending stiffness using technology for forming a hollow double-walled structure and inner ribs, the plate thickness of the pallet must be made greater than that of a conventional pallet while the inner ribs must be densely arranged in order to manufacture a pallet satisfying strength standards. Therefore, a distance between a first wall and a second wall in the pallet must be widened (25 mm or more in concrete terms), and a pitch between the plurality of inner ribs must be narrowed. When the distance between the first wall and the second wall is widened, and the pitch between the adjacent inner ribs is narrowed, however, the parison is greatly extended by the blade, and particularly a portion extended in the vicinity of an intersection portion of the inner ribs in which the parison is most greatly extended by the blade is broken so that blow molding cannot be performed.

A method for solving the problem that the parison is broken by respectively thrusting two blades on the parison from one side and the other side thereof has been considered, as illustrated in Patent Document 2. More specifically, this method is a method for respectively thrusting the blades on the parison from the right and left sides thereof, and abutting and fusing portions of the parison thus extended at the center of the parison, to form inner ribs. According to this manufacturing method, the movement amount of the parison in thrusting the blades on the parison may be half of that in the conventional manufacturing method. Therefore, the wall thickness of the parison is sufficiently ensured so that the inner ribs can be formed without breaking the parison.

Patent Document 1: Japanese Utility Model Application Laid-Open Publication No. 6-3833
Patent Document 2: Japanese Patent Application Laid-Open Publication No. 60-90133

DISCLOSURE OF THE INVENTION

Problems to be Solved by the Invention

In the method discussed in Patent Document 2, an angle formed between the direction in which the blade thrust on the parison from the left thereof runs and the direction in which the blade thrust on the parison from the right thereof runs is a right angle. Therefore, one of the inner ribs formed by the blade thrust from the left and the other inner rib formed by the blade thrust from the right are coupled to each other only at their intersection. Thus, a coupled state between the one inner rib and the other inner rib becomes unstable. If a bending stress is repeatedly applied to the pallet, the inner rib may, in some cases, be damaged with a coupling portion as its starting point.

The present invention has been developed to solve the above-mentioned problem. More specifically, the present invention is directed to providing a pallet having a large thickness, inner ribs not easily damaged formed therein, and a high bending strength.

Means for Solving the Problems

As a result of tremendous research efforts under the above-mentioned problems and background, the inventors of the present invention have found that in processes for manufacturing a pallet, the above-mentioned problem can be soled by thrusting movable blades, each including a longitudinal blade, a transverse blade and a cross blade, into a parison from both sides thereof and abutting and fusing portions of the extended parison, to complete the present invention based on the knowledge.

More specifically, the present invention is directed to a pallet having a hollow double-walled structure formed by blow molding. The pallet includes a first wall on which a cargo is placed, a second wall spaced apart from the first wall by a predetermined distance, and inner ribs that connect the first wall and the second wall. The inner ribs are formed by continuously abutting and integrating an end surface of a first inner rib projecting from the first wall toward a hollow portion and an end surface of a second inner rib projecting from the second wall toward the hollow portion.

The present invention is directed to the pallet in which the inner rib is formed integrally by abutting and fusing the end surface of the first inner rib perpendicularly extending from the first wall toward the second wall and the end surface of the second inner rib perpendicularly extending from the second wall toward the first wall, and a distance between the first wall and the second wall is 25 mm or more.

The present invention is directed to the pallet in which the inner ribs intersect one another in a cross shape, to form an intersection portion.

The present invention is directed to the pallet in which a void portion is formed in the boundary between the first inner rib and the second inner rib and in the vicinity of the intersection portion.

The present invention is directed to the pallet in which a void portion is formed around the intersection portion.

The present invention is directed to the pallet in which the wall thickness of a first folded wall portion, positioned on the side of the first wall, of the void portion and the wall thickness of a second folded wall portion, positioned on the side of the second wall, of the void portion are respectively greater than the wall thickness of the other portion of the inner rib.

The present invention is directed to the pallet in which the pallet is composed of a mixture of polyethylene and polypropylene.

A configuration in which the above-mentioned inventions are combined, as needed, can be employed if it answers the object of the present invention.

Effect of the Invention

In a pallet according to the present invention, in the manufacturing process thereof, blades are respectively thrust on a parison from both sides thereof, and portions of the parison are fused in the middle of a hollow portion, to form inner ribs. Therefore, the extension amount of resin moved by the blades can be minimized. Particularly, the blade including a longitudinal blade and a transverse blade that form inner ribs arranged in cross directions and a cross blade forming an intersection portion in a solid shape positioned at an intersection of the inner ribs spaced apart from each other is used, which can prevent the break of the parison as much as possible in manufacturing the pallet.

Furthermore, the blades are only thrust on the parison more shallowly than those in the conventional example so that the inner ribs are formed. Therefore, the wall thickness of the formed inner rib becomes larger than that of the conventional inner rib. Particularly, the wall thickness of the inner rib can be increased at a position, at the center in the height direction of the inner rib, where an end surface of a first inner rib and an end surface of a second inner rib are welded to each other. As a result, the bending stiffness (bending strength) of the pallet according to the present invention becomes greater than the bending stiffness of the conventional pallet.

A void portion corresponding to a distance between the blades is formed in the vicinity of an intersection portion in which the inner ribs in the pallet according to the present invention intersect each other. Therefore, spaces defined by the inner ribs are not isolated from but communicate with each other, to eliminate the possibilities that a rise in temperature causes air in each of the spaces to expand and causes irregularities on an upper wall surface of the pallet. During blow molding, the whole parison can be expanded only by making the circulation of pressurized air from a blowing opening suitable, reducing the number of blowing pins, and ensuring at least one blowing opening.

Furthermore, the wall thickness of the inner rib around the void portion is greater than the wall thickness of the inner rib in a portion other than the periphery of the void portion because the extension amount thereof is small. The inner rib formed in the pallet according to the present invention becomes higher in strength than the conventional inner rib.

Figure 1:
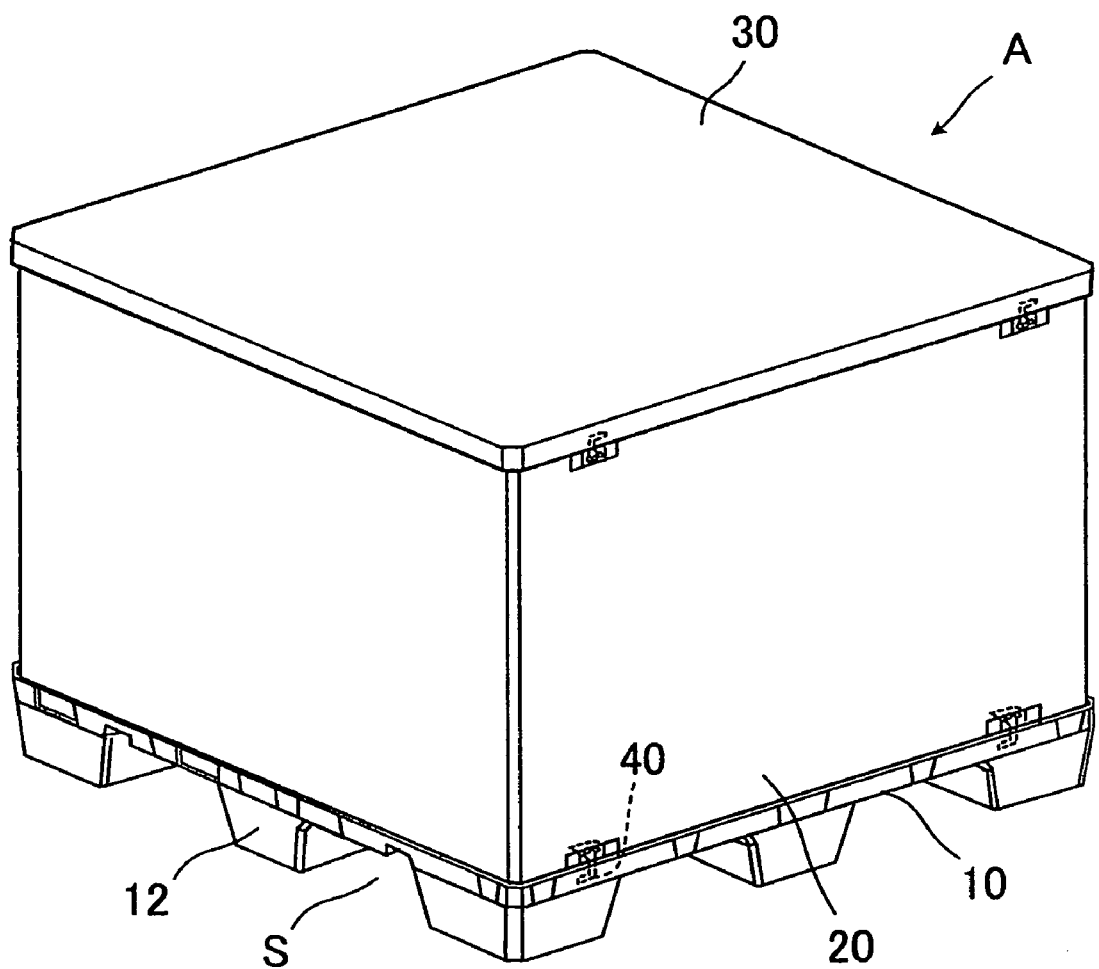
FIG. 1 illustrates an example of a transport container using a pallet according to the present embodiment.

DESCRIPTION OF SYMBOLS 10 pallet
11 mounting groove
11a relief hole
12 leg
13 first wall
13a first inner rib
13b first inner rib
14 second wall
14a second inner rib
14b second inner rib
15 intersection portion
20 sleeve
30 cover unit
40 fixing unit
41 hook member
41a hook
42 relief hole
50 parison
60 split mold
70 movable blade
7a longitudinal blade
7b transverse blade
7c cross blade
80 recess
A transport container
H void portion
S fork insertion opening
V hollow portion

BEST MODE FOR CARRYING OUT THE INVENTION

Figure 2:
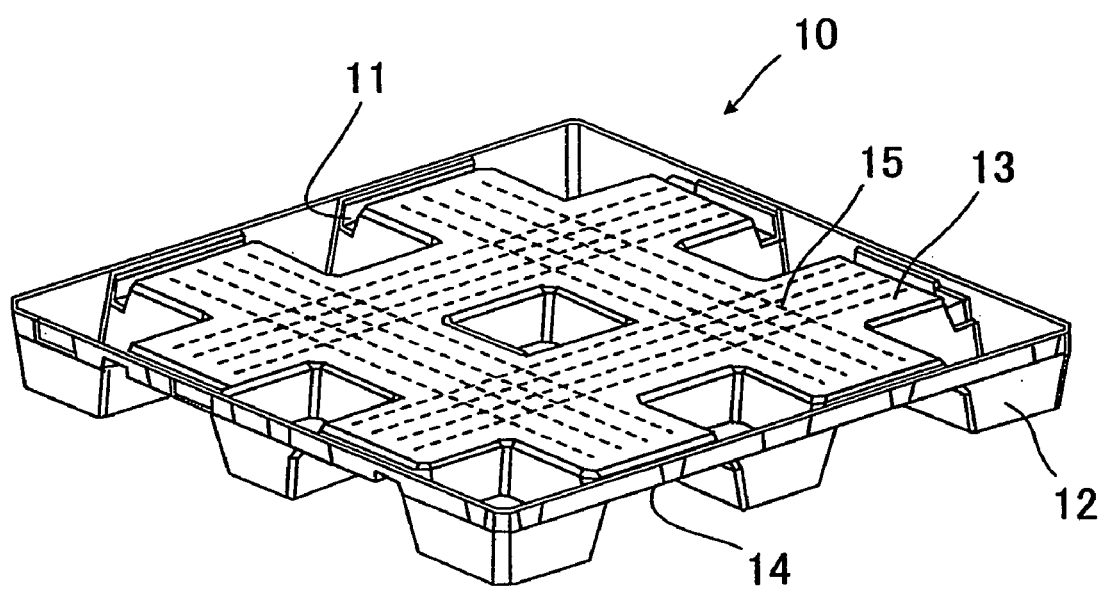
FIG. 2 illustrates the pallet according to the present embodiment.

An embodiment of the present invention will be described with reference to the drawings. FIG. 1 illustrates an example of a transport container using a pallet according to the present embodiment. FIG. 2 illustrates the pallet according to the present embodiment. A transport container A in which a pallet is incorporated will be first described. As illustrated in FIG. 1, the transport container A includes a pallet 10 according to the present embodiment serving as the bottom of the transport container A, a sleeve 20 forming a sidewall of the transport container A, and a cover unit 30 serving as a cover of the transport container A.

The pallet 10 is rectangular, and a mounting groove (not illustrated) is formed around the pallet 10. The sleeve 20 is provided upright in the mounting groove formed in the pallet 10 and fixed thereto so that the sidewall of the transport container A is formed. Similarly, a mounting groove is also formed in the cover unit 30. The sleeve 20 is fitted in the mounting groove and fixed thereto.

Figure 3:
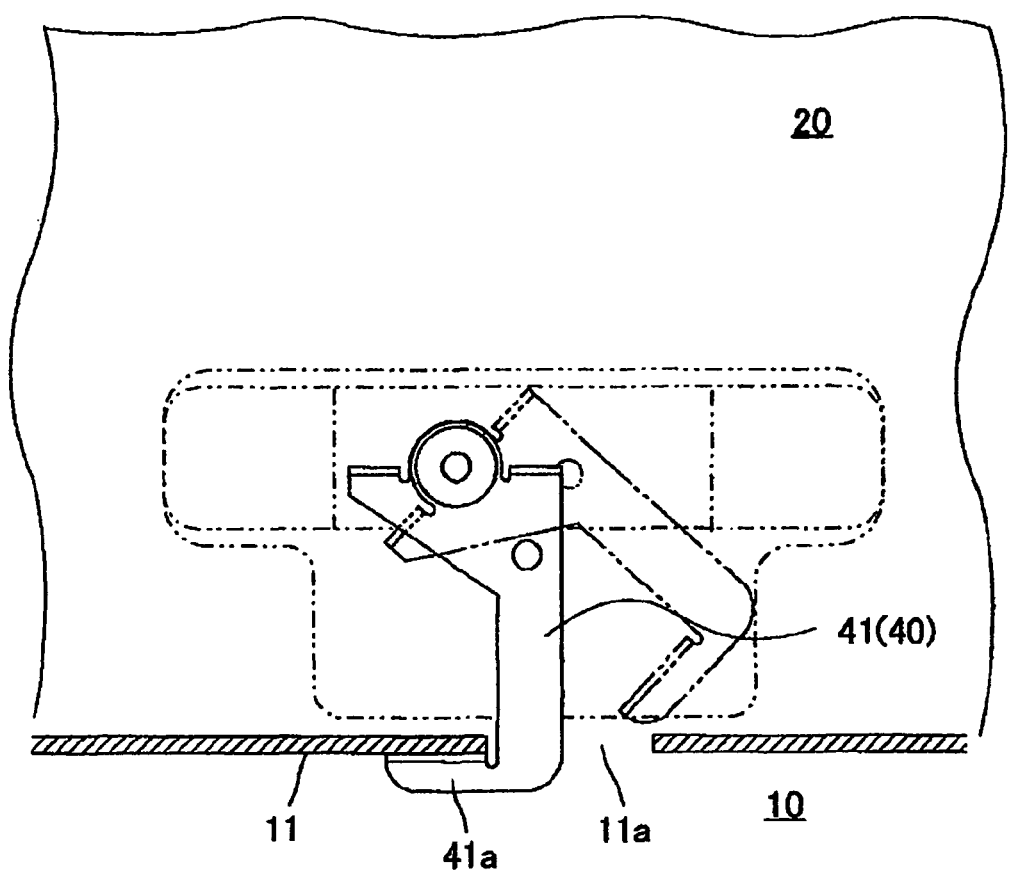
FIG. 3 illustrates an example of a fixing unit.

The transport container A includes a fixing unit 40 for preventing the sleeve 20 from coming off the pallet 10. For example, in the present embodiment, a hook member 41 having a hook 41a formed therein is rotatably attached to the sleeve 20, and a relief hole 11a for relieving contact between the hook 41a and the bottom of a mounting groove 11 is formed in the mounting groove 11, so that the sleeve 20 and the pallet 10 are fixed, as illustrated in FIG. 3. When the hook member 41 is turned after the sleeve 20 is placed on the mounting groove 11, the hook 41a enters the relief hole 11a and catches the reverse of a bottom surface of the mounting groove 11. As a result, the sleeve 20 does not come off the pallet 10.

A plurality of legs 12 is formed on each of the sides of the pallet 10 at a peripheral edge of a bottom surface of the pallet 10, to enter a state where the bottom surface floats. The pallet 10 is raised to a predetermined height from the ground so that fork insertion openings S for respectively inserting forks (parts of a fork lift) are formed between the pallet 10 and the ground. The forks are inserted into the fork insertion openings S so that the transport container A is easily conveyed by a fork lift.

Furthermore, the fork insertion openings S are formed on all the sides of the pallet 10. In what way the transport container A is placed, therefore, the fork insertion openings S are always directed toward the front of the pallet 10. Therefore, a worker need not consider the way the transport container A is placed when a cargo is discharged or unloaded, so that the worker can efficiently perform work. This transport container A is significantly useful.

The pallet 10 has a hollow double-walled structure formed by blow molding, and grid-shaped inner ribs are formed in a hollow portion. Therefore, the pallet 10 is lightweight and has high bending strength.

A material used for the pallet 10 is an easily blow-moldable material, for example, a thermoplastic resin. Particularly, a mixture of polyethylene and polypropylene can be used from the viewpoint of easy moldability, fusion characteristics, stiffness of a finished product, and so on.

Figure 4:
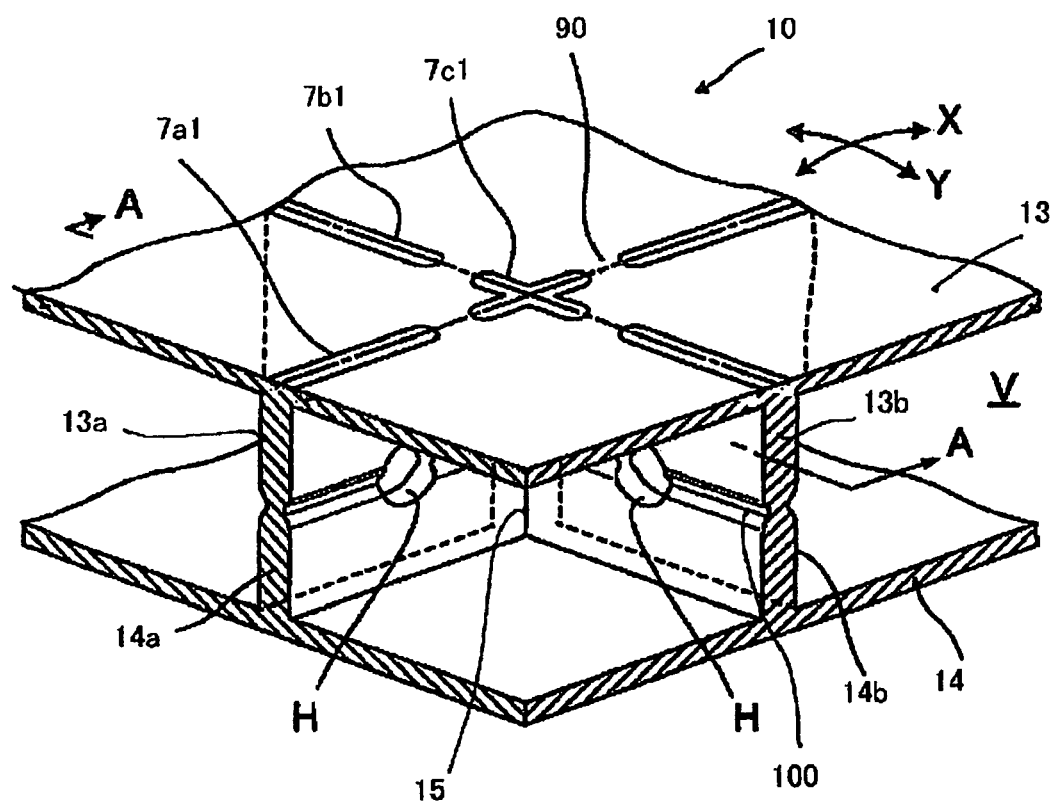
FIG. 4 is a perspective, cross-sectional view of a principal part of a pallet formed by blow molding in the present embodiment.
Figure 5:
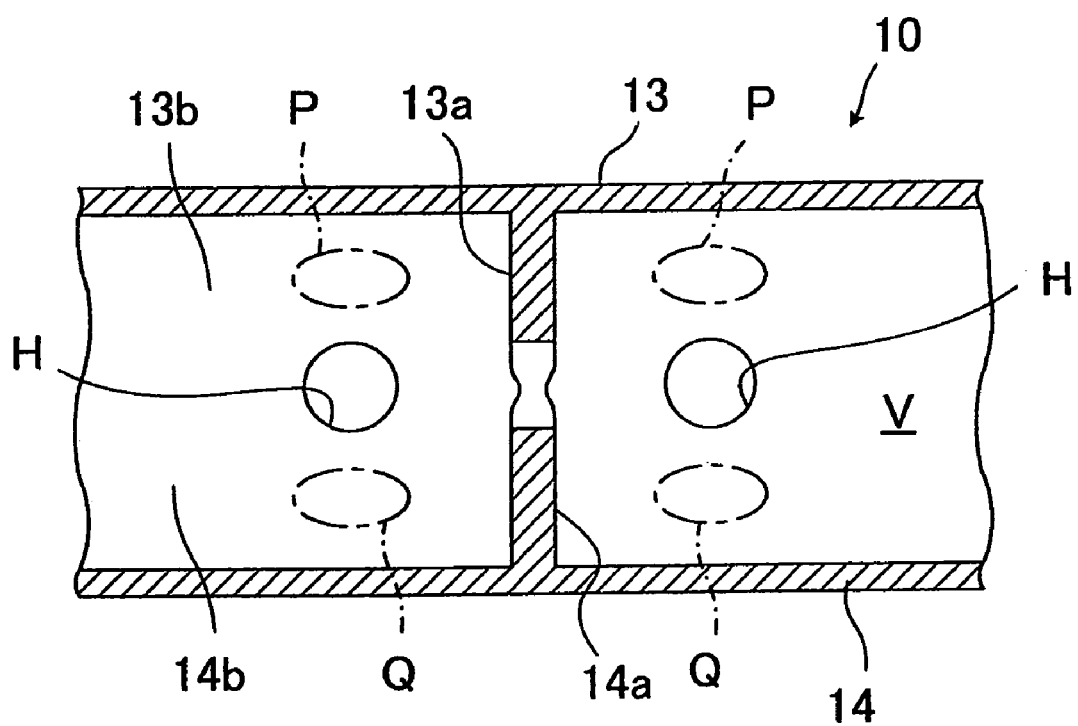
FIG. 5 is a cross-sectional view of the principal part of the pallet according to the present embodiment.
Figure 6:
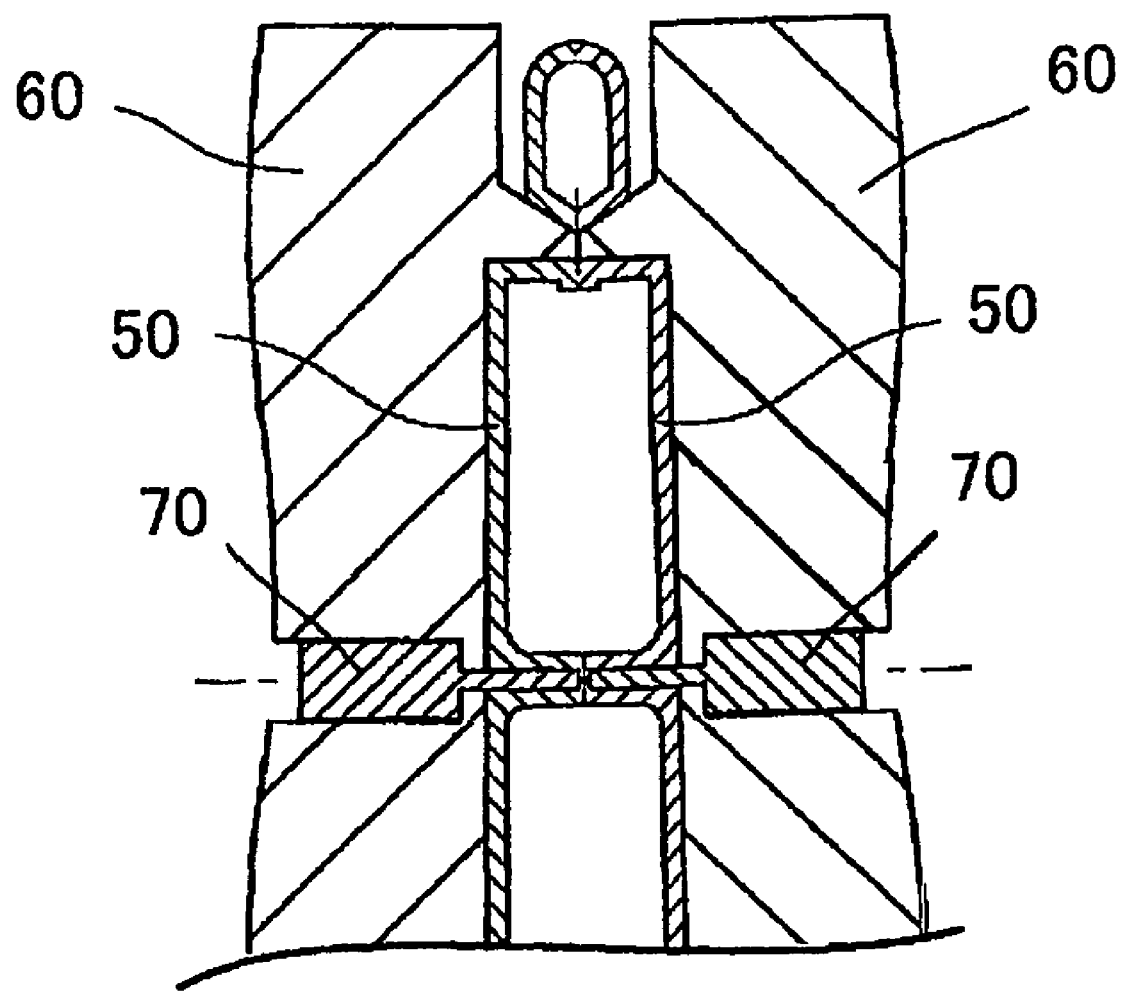
FIG. 6 illustrates a state where a parison is sandwiched between split molds.

FIG. 4 is a perspective, cross-sectional view of a principal part of the pallet formed by blow molding in the present embodiment. FIG. 5 is a cross-sectional view of the principal part of the pallet according to the present embodiment. As illustrated in FIG. 4, the pallet 10 includes a first wall 13 on which a cargo is placed, and a second wall 14 spaced apart from the first wall 13 by a predetermined distance and serving as the bottom of the pallet 10. Inner ribs for coupling the first wall 13 and the second wall 14 are formed in a grid shape in a hollow portion V formed between the first wall 13 and the second wall 14 (see FIG. 2), to increase the bending strength of the pallet 10.

The inner rib running in a direction indicated by an arrow X is formed by continuously abutting and fusing and integrating an end surface of a first inner rib 13a perpendicularly extending from the first wall 13 toward the second wall 14 and an end surface of a second inner rib 14a perpendicularly extending from the second wall 14 toward the first wall 13 in the middle of the hollow portion V. The first inner rib 13a is integral with the first wall 13 and is superior in strength because it is formed by extending a part of the first wall 13 toward the second wall 14 in the molding process. As a result, even if a great bending stress is repeatedly applied to the first inner rib 13a, the first inner rib 13a is not easily damaged, for example.

Similarly, the second inner rib 14a is formed by extending a part of the second wall 14 toward the first wall 13 in the molding process. Even if a great bending stress is repeatedly applied to the second inner rib 14a from similar reasons to the above-mentioned reasons, therefore, the second inner rib 14a is not easily damaged, for example.

The inner rib running in a direction indicated by an arrow Y is formed by continuously abutting and fusing and integrating a first inner rib 13b perpendicularly extending from the first wall 13 and a second inner rib 14b perpendicularly extending from the second wall 14 in the middle of the hollow portion V. The inner rib running in the direction indicated by the arrow X and the inner rib running in the direction indicated by the arrow Y are formed in the shape of a continuous solid plate. Both the inner ribs integrally intersect each other via an intersection portion. The inner ribs including the intersection portion are formed in a grid shape so that the bending strength of the pallet 10 according to the present embodiment is increased in all directions so that the pallet 10 is prevented from being easily deformed.

Although a wall folding line 90 corresponding to the first inner rib 13b is formed in a grid shape on a surface of the first wall 13, a longitudinal blade trace 7a1, a cross blade trace 7c1, and a transverse blade trace 7b1 serving as shallow recesses are respectively formed at positions corresponding to blades, described below, so that the position of the wall folding line 90 sinks on the bottom of each of the blade traces. Therefore, the wall folding line 90 does not project on the surface, which can prevent deterioration in the smoothness of the hollow double-walled structure A. The depth of the recess is preferably in a range of 0.1 to 5.0 mm in order to attain the above-mentioned object as each of the blade traces. Each of the blade traces is formed by molding with the blade slightly projected from a cavity surface of a mold when retreated.

In this case, the number of intersection portions of inner ribs to be formed, and the number and the thickness of the inner ribs, for example, can be freely set when the pallet 10 is manufactured, as described below, and can be determined, as needed, in consideration of applications and a use environment of the manufactured pallet 10.

When the maximum gross mass of a cargo loaded on the pallet (e.g., 200 cm×300 cm) 10 is set to approximately 30 tons, for example, 10 to 12 is enough for the number of intersection portions of the inner ribs formed in longitudinal and transverse directions, and 8 to 12 and approximately 3 to 8 mm are respectively enough for the number of inner ribs and the thickness thereof.

As illustrated in FIGS. 4 and 5, in the inner ribs in the pallet 10 according to the present embodiment, void portions H are respectively formed in the boundary between the first inner rib 13a and the second inner rib 14a and the boundary between the first inner rib 13b and the second inner rib 14b. A wall, on the side of the first wall 13 of the first inner rib 13b, of the void portion H, i.e., a first folded wall portion P is thicker than the other portion of the first inner rib 13b. Similarly, a wall, on the side of the second wall 14 of the second inner rib 14b, of the void portion H, i.e., a second folded wall portion Q is also thicker than the other portion of the second inner rib 14b.

The same is true for the inner rib running in the direction indicated by the arrow X. Therefore, the first folded wall portion of the first inner rib 13a and the second folded wall portion of the second inner rib 13b are also thicker than the other portions.

As a result, the first inner ribs 13a and 13b and the first wall 13 are firmly coupled to each other, and the second inner ribs 14a and 14b and the second wall 14 are also firmly coupled to each other. Therefore, the inner rib in the present embodiment becomes firmer than an inner rib having no void portion H formed therein.

In the pallet 10 according to the present embodiment, the void portions H are respectively formed in all the inner ribs extending in all directions, centered around an intersection portion 15. As a result, the strength of the inner ribs surrounding the intersection portion 15 is increased in a balanced manner, so that the whole strength of the pallet 10 is increased.

The void portions H are formed so that respective spaces, in the pallet, defined by the inner ribs are not isolated from but communicate with one another. Generally, the pallet 10 is heated, particularly in the summer when used outdoors. However, there are no possibilities that the rise in temperature causes air in each of the spaces defined by the inner ribs to expand and cause irregularities on an upper wall surface of the pallet 10. On the other hand, one blowing opening of a pressurized fluid is enough during blow molding, which is significantly convenient.

A method for manufacturing the pallet according to the present embodiment will be then described. The pallet according to the present embodiment is manufactured by blow molding, and the inner ribs are formed by thrusting a movable blade 70 provided in each of split molds 60 on a parison 50 into which a pressurized fluid has not been blown, and extending its part into the parison.

First, the parison 50 extruded from a die (not illustrated) is sandwiched between the split molds 60, that is, clamped. The parison 50 may not, in some case, expand to the whole of the split molds when clamped depending on the shape of the split molds 60. In the case, therefore, the parison 50 is clamped after being expanded by piercing a blowing opening into the parison 50 and injecting a pressurized fluid in a predetermined amount, i.e., performing so-called pre-blowing.

Figure 7A:
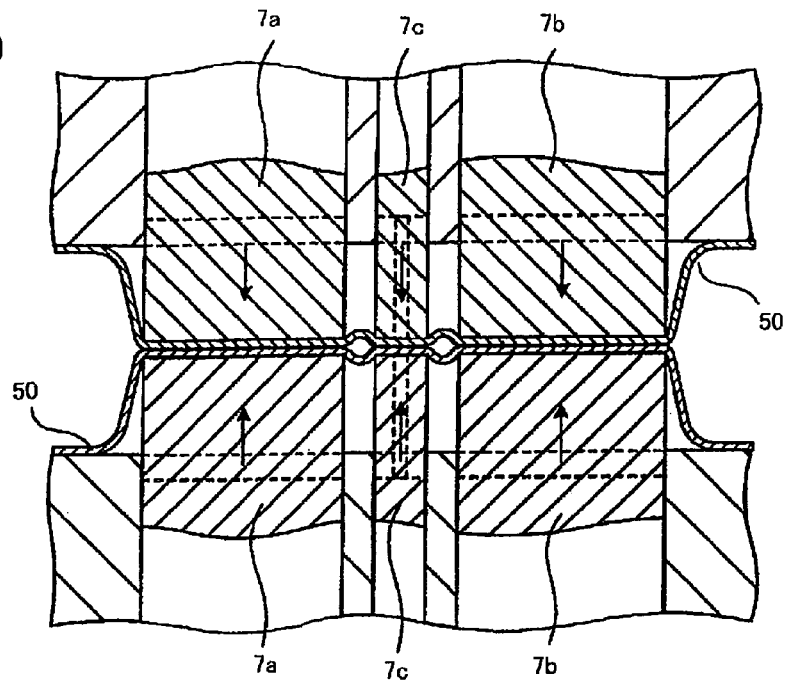
FIGS. 7(a) and (b) illustrate a state where movable blades are thrust on a parison.
Figure 7B:
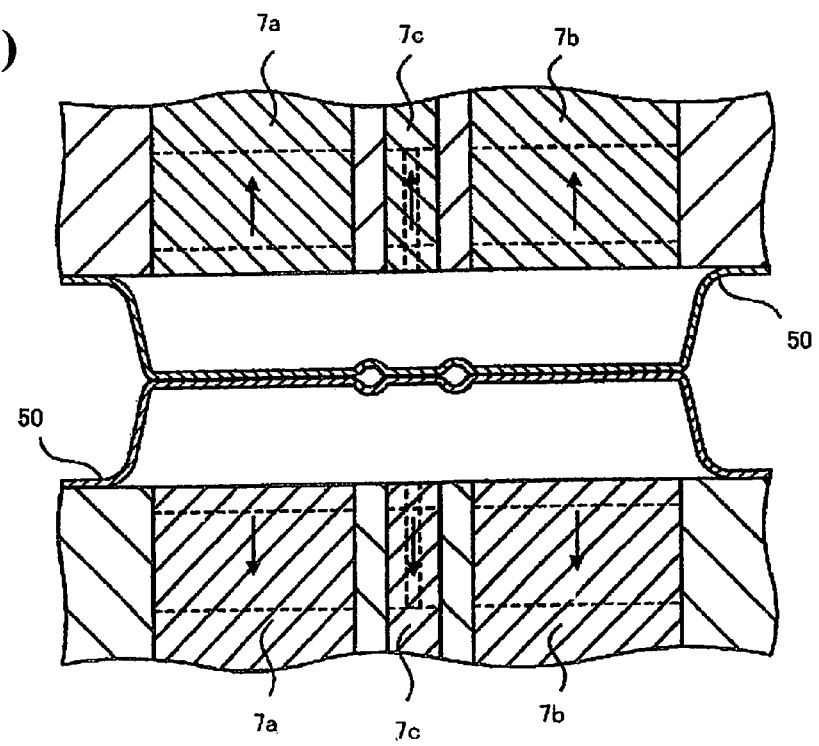

A pair of movable blades 70 provided in the split molds 60 is then slowly pieced toward the parison 50, as illustrated in FIG. 7(a), before the parison 50 is set, and the movable blades 70 are moved until extended portions of the parison 50 are abutted and fused at the center of the parison 50, as illustrated in FIG. 7 (b).

Figure 8:
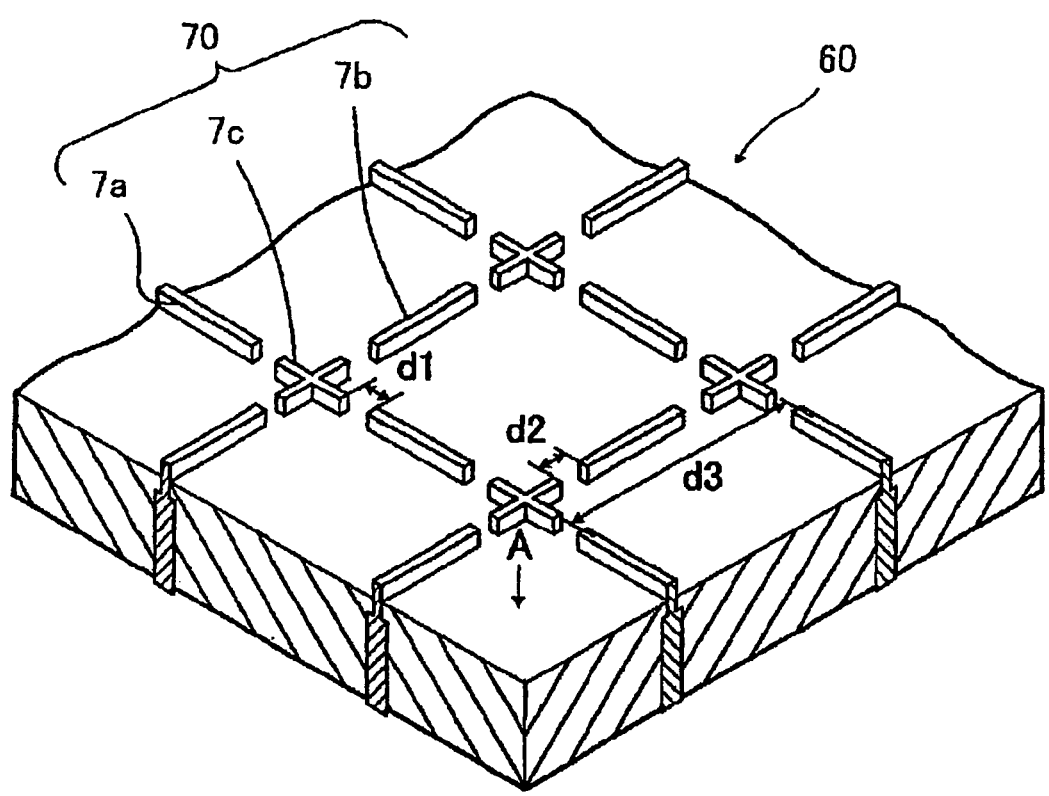
FIG. 8 illustrates an arrangement of a longitudinal blade, a transverse blade, and a cross blade.

FIG. 8 illustrates the arrangement of a longitudinal blade, a transverse blade, and a cross blade. As illustrated in FIG. 8, the movable blade 70 includes a plurality of longitudinal blades 7a for forming inner blades provided upright in a direction parallel to the parison 50 that droops (in a vertical direction in the drawing), a plurality of transverse blades 7b for forming inner blades provided upright in a direction perpendicular to the longitudinal blades 7a, and a plurality of cross blades 7c for forming intersection portions. The respective lengths of the longitudinal blade 7a and the transverse blade 7b are preferably approximately 20 to 125 mm. The respective widths of the longitudinal blade 7a and the transverse blade 7b are preferably approximately 1 to 7 mm. Furthermore, all the lengths of the four arms of the cross blade 7c can be equal, and the lengths of the arms are preferably approximately 2 to 10 mm.

The longitudinal blades 7a and the cross blades 7c are alternately spaced apart by a predetermined distance on one straight line. Similarly, the transverse blades 7b and the cross blades 7c are also alternately spaced apart by a predetermined distance on one straight line. A distance d1 between the longitudinal blade 7a and the cross blade 7c preferably satisfies d1<L, letting L be the thickness of the hollow double-walled structure, and a distance d2 between the transverse blade 7b and the cross blade 7c preferably satisfies d2<L. A formation pitch d3 between the cross blades 7c preferably satisfies h<d3<5L, and more preferably satisfies $2L \leq d3 \leq 3L$. Respective end surfaces of the three blades are in the same plane, and integrally move parallel to one another with the state maintained. In a state where the inner rib in the X direction and the inner rib in the Y direction are connected to each other and the void portion H is formed in the vicinity of the intersection portion 15, however, the cross blade 7c can be made low or eliminated for the purpose of adjusting the shape of the intersection portion 15. In this case, although respective leading ends of the first inner ribs 13a and 13b and the second inner ribs 14a and 14b are not respectively welded to each other in the intersection portion 15, a wall of the intersection portion 15 is folded in a cross shape, to connect the inner rib in the X-direction including the first inner rib 13a and the second inner rib 14a and the inner rib in the Y-direction including the first inner rib 13b and the second inner rib 14b and form a relatively large void portion H in a boundary 100.

The longitudinal blade 7a and the cross blade 7c are spaced apart by a predetermined distance. Therefore, a portion, which comes into contact with neither of the longitudinal blade 7a and the cross blade 7c, of the parison 50 is not directly formed by the blade and thus, is extended, as shown in FIG. 7 (b). However, the portion is not sufficiently extended to enter a slack state, and is folded by the subsequent blowing of pressurized air without being abutted and integrally welded to become a so-called folded wall portion in an arc shape, to form a part of the inner rib. As a result, a void portion H in a substantially circular shape is formed between a portion extended by the longitudinal blade 7a and a portion extended by the cross blade 7c. More specifically, a void portion H is formed between the inner blade formed by the longitudinal blade 7a and the intersection portion serving as the inner blade formed by the cross blade 7c.

Similarly, the transverse blade 7b and the cross blade 7c are spaced apart by a predetermined distance. Therefore, a void portion H is formed between the inner blade formed by the transverse blade 7b and the intersection portion from similar reasons to the above-mentioned reasons.

The inner rib in the X-direction, the inner rib in the Y-direction, and the intersection portion 15 are continuously formed, as described above, so that the wall folding lines 90 in a continuously linear shape are formed on the surfaces of the first wall 13 and the second wall 14 in a cross shape with the root of the intersection portion 15 as an intersection.

Figure 9A:
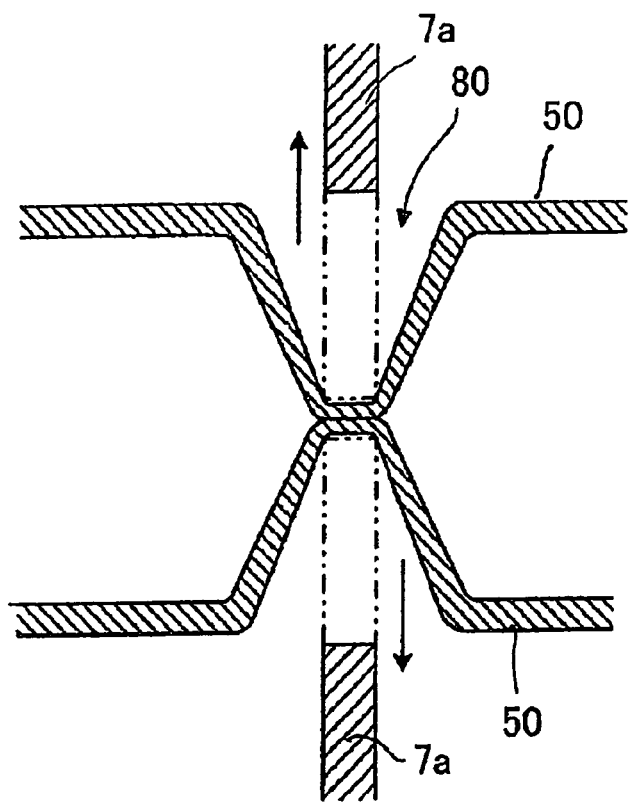
FIGS. 9(A) and (B) illustrate a mode in which an inner rib is formed.

After the movable blades 70 are pierced into the parison 50, the movable blades 70 are slowly pulled out of the parison 50, as illustrated in FIG. 9(A) (a cross section along the line B-B in FIG. 7 (b)). At this time, a recess 80 is formed on a surface of the parison 50.

Figure 9B:
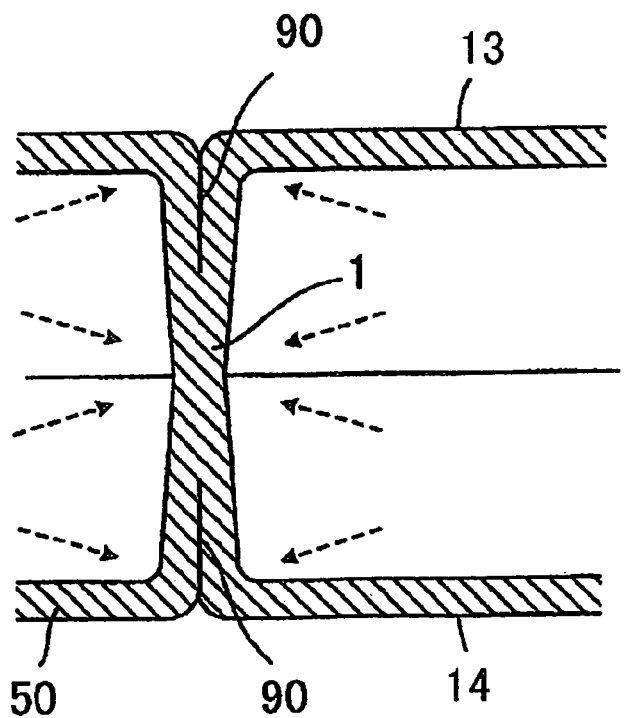

The pressurized fluid is then injected into the parison from the blowing opening which has been pierced into the parison, to expand the parison 50 along the shape of the split molds 60. The pressurized fluid is injected into the parison 50 so that the recess 80 is closed and fused by the pressure of the pressurized fluid, to form a solid inner rib in the shape of a solid timber, as illustrated in FIG. 9(B).

At this time, the void portion H is formed between the extended portion formed by the cross blade 7c and the extended portion formed by the longitudinal blade 7a or the transverse blade 7b, as described above, so that respective spaces surrounded by the extended portions are not isolated from but communicate with each other.

Although the present invention has been described, the present invention is not limited to the present embodiment. Various modified examples are permitted. For example, the present invention is not limited to the embodiment illustrated in FIGS. 1 to 3. The cross blade 7c, the longitudinal blade 7a, and the transverse blade 7b can be also integrated.

The invention claimed is:

1. In a four-way pallet which serves as a bottom of a transport container, the improvement comprising the pallet having a hollow double-walled structure formed by blow molding and comprising:
   a first wall on which a cargo is placed;
   a second wall spaced apart from the first wall by a predetermined distance;
   an inner rib that connects the first wall and the second wall; and
   a plurality of legs formed at each side of the pallet at a peripheral edge of a bottom surface thereof, wherein
   the inner rib is a solid inner rib formed by continuously abutting and integrating an end surface of a first inner rib projecting from the first wall toward a hollow portion and formed by extending a part of the first wall towards the second wall and an end surface of a second inner rib projecting from the second wall toward the hollow portion and formed by extending a part of the second wall towards the first wall,
   a plurality of the inner ribs are arranged along a position into which a fork of a forklift is inserted and in directions perpendicular to one another and are formed to intersect one another in a cross shape via an intersection portion,
   wall folding lines in a continuously linear shape are formed on the surfaces of the first wall and second wall in a cross shape with the base of the intersection portion as an intersection,
   a longitudinal blade trace, a cross blade trace, and a transverse blade trace serving as shallow recesses are formed on a surface of the first wall such that the positions of the wall folding lines sink on the bottoms of the blade traces,
   a void portion communicating with the hollow portion is formed in the boundary between the first inner rib and the second inner rib and in the vicinity of the intersection portion, and
   a mounting groove in which a sleeve forming a sidewall of the transport container is fitted is formed around the pallet.

2. The pallet according to claim 1, wherein the inner rib is formed integrally by abutting and fusing the end surface of the first inner rib perpendicularly extending from the first wall toward the second wall and the end surface of the second inner rib perpendicularly extending from the second wall toward the first wall, and a distance between the first wall and the second wall is 25 mm or more.

3. The pallet according to claim 1, wherein the pallet is composed of a mixture of polyethylene and polypropylene.

* * * * *